US009535880B2

(12) United States Patent
Gupta et al.

(10) Patent No.: US 9,535,880 B2
(45) Date of Patent: Jan. 3, 2017

(54) METHOD AND APPARATUS FOR PRESERVING FIDELITY OF BOUNDED RICH TEXT APPEARANCE BY MAINTAINING REFLOW WHEN CONVERTING BETWEEN INTERACTIVE AND FLAT DOCUMENTS ACROSS DIFFERENT ENVIRONMENTS

(71) Applicant: Adobe Systems Incorporated, San Jose, CA (US)

(72) Inventors: Yash Kumar Gupta, Agra (IN); Narender Gupta, Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 306 days.

(21) Appl. No.: 14/260,743

(22) Filed: Apr. 24, 2014

(65) Prior Publication Data

US 2015/0309966 A1 Oct. 29, 2015

(51) Int. Cl.
*G06F 17/00* (2006.01)
*G06F 17/21* (2006.01)
*G06F 17/22* (2006.01)

(52) U.S. Cl.
CPC .......... *G06F 17/211* (2013.01); *G06F 17/217* (2013.01); *G06F 17/2264* (2013.01)

(58) Field of Classification Search
CPC ... G06F 17/211; G06F 17/217; G06K 2209/01
See application file for complete search history.

(56) References Cited

U.S. PATENT DOCUMENTS

| | | | | |
|---|---|---|---|---|
| 8,639,032 B1 * | 1/2014 | Voorhees | ................. | G09B 5/02 348/143 |
| 2004/0145593 A1 * | 7/2004 | Berkner | .................. | G06T 11/60 345/619 |
| 2004/0225997 A1 * | 11/2004 | Van De Vanter | ......... | G06F 8/33 717/109 |
| 2004/0225998 A1 * | 11/2004 | Van De Vanter | ......... | G06F 8/33 717/113 |
| 2008/0092040 A1 * | 4/2008 | Nakamura | ......... | H04N 1/00222 715/273 |
| 2008/0178073 A1 * | 7/2008 | Gao | ........................ | G06F 17/24 715/243 |
| 2009/0254455 A1 * | 10/2009 | Rothey | ............. | G06F 17/30696 705/26.1 |
| 2010/0169077 A1 * | 7/2010 | Yang | ...................... | G06K 9/344 704/9 |
| 2010/0251104 A1 * | 9/2010 | Massand | ................. | G06F 17/24 715/249 |

(Continued)

*Primary Examiner* — Scott Baderman
*Assistant Examiner* — Benjamin J Smith
(74) *Attorney, Agent, or Firm* — Keller Jolley Preece

(57) ABSTRACT

A computer implemented method and apparatus for preserving fidelity of bounded rich text appearance, by maintaining reflow, when converting between interactive and flat documents across different environments. The method comprises receiving an image, text data, and formatting metadata corresponding to text entered on a webpage; and processing the text data, wherein processing includes using the image and formatting metadata, evaluating a count of characters corresponding to a line of entered text to identify a location in the image for insertion of a newline character; and inserting the newline character at a location identified during the evaluating.

20 Claims, 6 Drawing Sheets

(56) References Cited

U.S. PATENT DOCUMENTS

| | | | |
|---|---|---|---|
| 2011/0222773 A1* | 9/2011 | Radakovic | G06K 9/00469 |
| | | | 382/182 |
| 2012/0265655 A1* | 10/2012 | Stroh | G06Q 40/00 |
| | | | 705/30 |
| 2013/0151952 A1* | 6/2013 | Yamamoto | G06F 17/21 |
| | | | 715/243 |
| 2014/0040767 A1* | 2/2014 | Bolia | G06F 3/1454 |
| | | | 715/751 |
| 2014/0126812 A1* | 5/2014 | Chulinin | G06K 9/342 |
| | | | 382/165 |
| 2014/0164366 A1* | 6/2014 | Narayanan | G06F 17/30014 |
| | | | 707/723 |
| 2014/0365203 A1* | 12/2014 | Waibel | G06F 17/24 |
| | | | 704/2 |
| 2015/0206169 A1* | 7/2015 | Ye | G06Q 30/0242 |
| | | | 705/14.41 |
| 2015/0371219 A1* | 12/2015 | Ljujic | G06Q 20/355 |
| | | | 358/1.18 |

* cited by examiner

FIG. 4

ENTERED TEXT: Once upon a midnight dreary, while I pondered weak and weary,Over many a quaint and curious volume of forgotten lore — 502

FIG. 5A

ENTERED TEXT: Once upon a midnight dreary, while I pondered weak and weary,Over many a quaint and curious volume of forgotten lore — 504

FIG. 5B

Once upon a midnight dreary, while I pondered — 506 weak and weary,Over many a quaint and — 508 curious volume of forgotten lore — 510

FIG. 5C

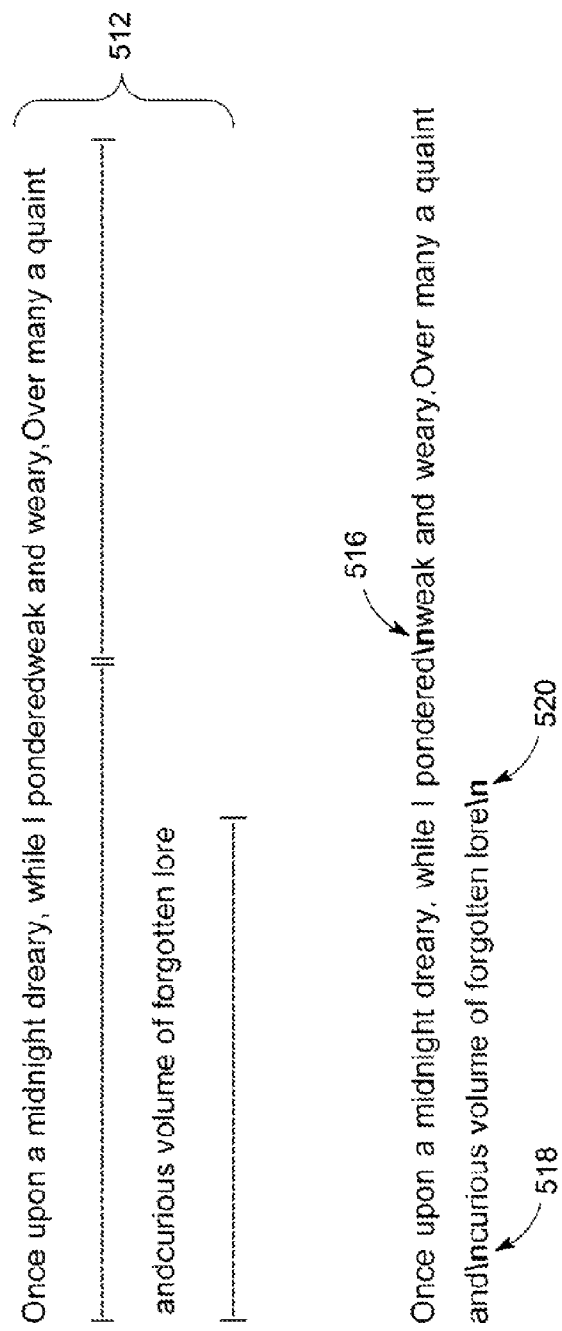

METHOD AND APPARATUS FOR PRESERVING FIDELITY OF BOUNDED RICH TEXT APPEARANCE BY MAINTAINING REFLOW WHEN CONVERTING BETWEEN INTERACTIVE AND FLAT DOCUMENTS ACROSS DIFFERENT ENVIRONMENTS

BACKGROUND OF THE INVENTION

Field of the Invention

Embodiments of the present invention generally relate to document conversion and, more particularly, to techniques for preserving fidelity of bounded rich text appearance by maintaining reflow when converting between interactive and flat documents across different environments.

Description of the Related Art

Plain text is represented as a pure sequence of character codes, such as ASCII codes, that only identify the content of characters of text and not their appearance. A "rich text" representation augments plain text by adding information that enhances the character content, such as font size, font color, text line end, language identifier, hypertext links, etc. If such enhancements are not maintained, a faithful representation, that is, the fidelity, of the rich text, will be lost.

It is not uncommon to enter rich text in an interactive document on a web page (via a browser) and then, later in time, view or edit the same document using a different browser or when the document is presented in a different form (e.g., a flattened Portable Document Format (PDF). HyperText Markup Language (HTML) is used to create web pages that can be displayed as an interactive document in a web browser. When text is entered into the interactive document, the text is added to an HTML element (e.g., a form field). The document, including text, is then saved and may be viewed later in a different web browser. Alternatively, the interactive document may be converted to a flattened document (i.e., a document without interactivity), for example a PDF and viewed later in a using a PDF reader. In either case, the saved text is of a same font-family, font-size, font-style, and other formatting metadata. However, the saved text may be displayed differently depending on the type of browser in which the text is later viewed. For example, text that was originally entered on a single line, when viewed later may be displayed on two lines. The later display of the text is different because each browser type understands, renders, and draws text style information differently. Also, boundary box dimensions for text entry areas in different browser types are different. As such, the display of a single line of entered text when using one browser type may display as two lines of text when using a different browser type. This provides a poor user experience. Therefore, there is a need for a method and apparatus for preserving fidelity of bounded rich text appearance by maintaining reflow when converting between interactive and flat documents across different environments.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for preserving fidelity of bounded rich text appearance by maintaining reflow when converting between interactive and flat documents across different environments is described. The method receives an image, text data and metadata that identifies how the text data is formatted. The method then processes the text data using the image and formatting metadata. The method evaluates a count of characters corresponding to a line of entered text to identify a location in the image for insertion of a newline character and inserts the newline character at the location identified during the evaluation.

In another embodiment, an apparatus for preserving fidelity of bounded rich text appearance by maintaining reflow when converting between interactive and flat documents across different environments is described. The apparatus includes a text processing module. The text processing module receives an image, text data and metadata that identifies how the text data is formatted. The text processing module then processes the text data using the image and formatting metadata to selectively add newline characters to the text data based on a count of characters in lines of the entered text.

In yet another embodiment, a computer readable medium for preserving fidelity of bounded rich text appearance by maintaining reflow when converting between interactive and flat documents across different environments is described. The computer readable medium stores computer instructions that, when executed by at least one processor causes the at least one processor to perform a method for preserving fidelity of rich text appearance when converting between interactive and flat documents. The method receives an image, text data, and formatting metadata corresponding to text entered on a webpage, and processes the text data using the image and formatting metadata to selectively add newline characters to the text data based on a count of characters in lines of the entered text.

BRIEF DESCRIPTION OF THE DRAWINGS

FIG. 4 illustrates a current view of how text is displayed differently depending on the browser in which a document is viewed and the format of the document; and FIG. 5A-5E collectively illustrate how fidelity of text is preserved, according to one or more embodiments.

Figure 1:
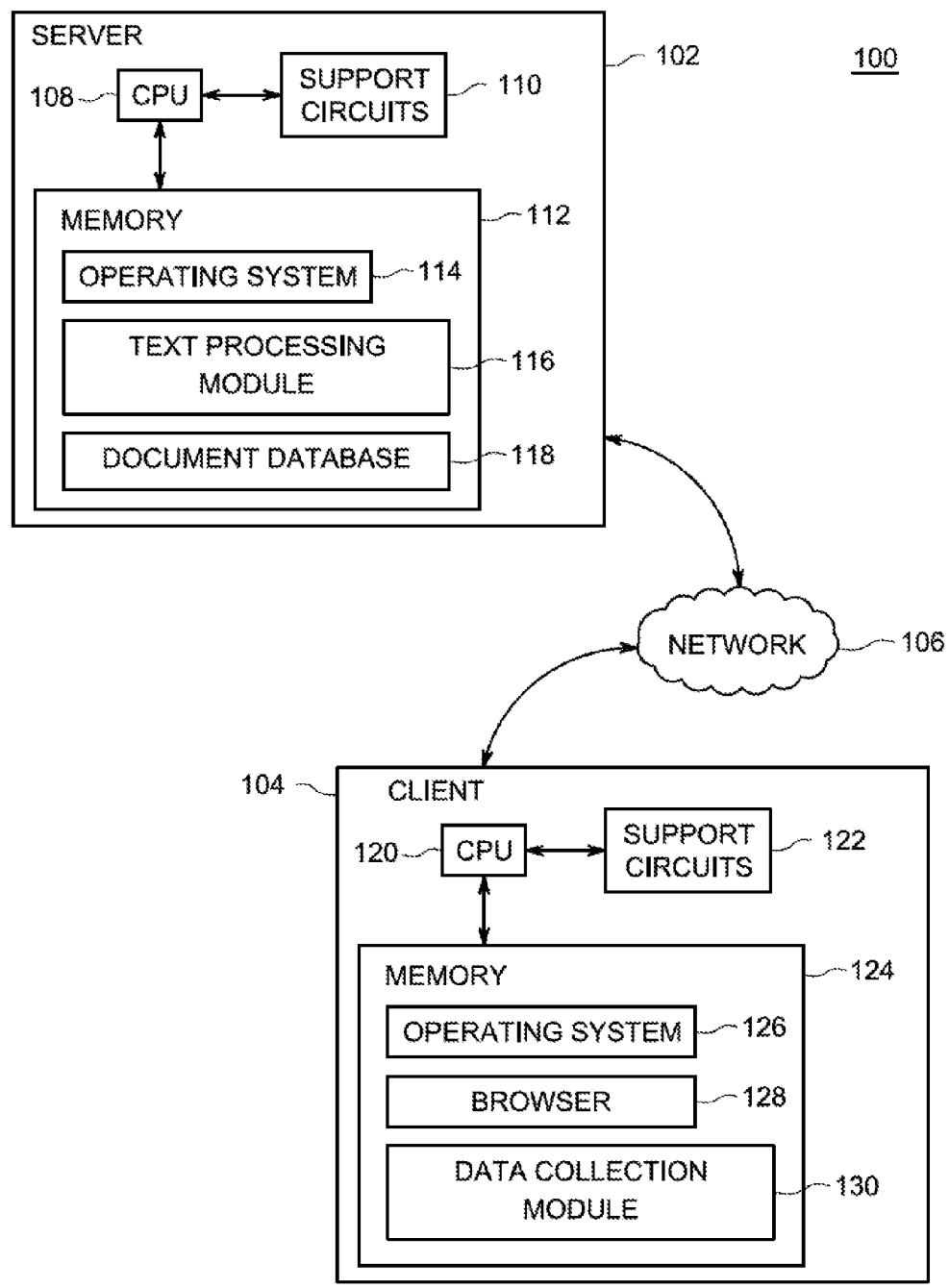
FIG. 1 is a block diagram of a system for preserving fidelity of bounded rich text appearance by maintaining reflow when converting between interactive and flat documents across different environments, according to one or more embodiments.

While the method and apparatus is described herein by way of example for several embodiments and illustrative drawings, those skilled in the art will recognize that the method and apparatus for preserving fidelity of bounded rich text appearance by maintaining reflow when converting between interactive and flat documents across different environments is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for preserving fidelity of bounded rich text appearance by maintaining reflow when converting between interactive and flat documents across different environments defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for preserving fidelity of bounded rich text appearance by maintaining reflow when converting between interactive and flat documents across different environments. When a user enters text into a document, for example, by filling out a form on-line, and submits the document, embodiments of the invention capture an image of each field where text was entered. For each field, the entered text, as well as additional information (e.g., formatting metadata), such as a font, font-size, font color, font style, a number of lines of text, and the like, is extracted from the image. According to embodiments of the invention, locally extracted image, text, and additional information are sent to a server for further processing. The server segments the image into individual lines of text. An image processing algorithm, for example, optical character recognition, is used to determine a character count for each line of text as well as an approximation of the actual entered text. The algorithm is then applied to the actual entered text. A character is identified at a position equal to the character count for the line. If a next character after the identified character is a newline character, no text is added. However, if the next character is not a newline character, a newline character is added to the text after the identified character. Thereafter, whenever a browser evaluates the text for display, the newline character ensures that line breaks occur at a same location as in the originally entered text. Hence, the text entered by the user in, for example a browser, looks exactly the same even after it has been converted to a flattened document and viewed, for example, as a PDF document, or when viewed in a different browser.

Existing solutions include extracting font glyphs from a source environment, for example a browser, and sending the glyphs to a target environment, for example a PDF document or similar mapping of fonts between the source environment and target environment. However, there are a number on nontrivial issues associated with those solutions. These existing solutions are not reliable and are prone to display rich text differently depending on the type of browser in which the text is viewed.

Thus, and in accordance with an embodiment of the present invention, techniques are provided herein that allow for preserving fidelity of rich text appearance when converting between interactive and flat documents. When a user enters text into a document, the user selects a location on the document where he or she wants the text to be entered, and then types the text at the location. The text may be a single line of text characters or multiple lines. When the user has finished entering text, the user submits the information, for example by clicking a "submit" or "save" button. An image is taken of the entered text upon submission.

HyperText Markup Language (HTML) is used to create web pages. HTML5 has a canvas element and JAVASCRIPT provides the ability to control rendering of an HTML web page, including HTML elements inside of the canvas element. As well known in the art, the Canvas tag exposes a more programmatic experience for drawing immediate mode graphics including the rectangle, path, and images. Typically, a web developer implements canvas capabilities of HTML5, by introducing a canvas element and then uses the <canvas> APIs to draw images and vectors. An image of the entered text as rendered by the browser can be extracted to create an exact replica using the canvas element. Thus, the image represents an exact same layout of the entered text as it was entered in the browser. The image information, herein referred to as image data is extracted from the canvas structure created using the canvas structure. The plain text data as well as rich text enhancements referred to herein as formatting metadata (i.e., font-family, font-size, font-color, font-style, number of lines of text entered, and the like) is extracted from the canvas structure. The image data, plain text data, and formatting metadata are sent to and received by a server that provides a service to process and store the data, for example, Acrobat.com.

The server receives the image data, the plain text data and the formatting metadata. At the server, the image, having a height and a width, is segmented into equal height sub-images. For example, if there are three (3) lines of text, the image is segmented into three lines of equal height. In the present example, the image height is divided by three to create three images, one image for each line of text. An image processing algorithm, such as optical character recognition (OCR) is used to extract the text from each line. Because the image of the text was created digitally, the image quality is very good, resulting in highly accurate OCR results. Additionally, because the OCR processing is performed on a single line of text, such processing requires little CPU time. A character count is calculated for each line of text. The character count identifies how many characters are in each line of text as the text was originally entered. Ideally, when the text is displayed at a later time, whether in a browser or as a PDF, the exemplary three lines of text are displayed exactly as they appeared when the text was originally entered. As such the character count of each line is used to identify when an exact number of characters for a line have been displayed and when a newline of text should be started.

OCR may be used to evaluate the plain text and identify a position in the text that is equal to the calculated character count. In order for the text to appear the same as originally entered, the identified position in the text must be the last character displayed on the line. As such, the last character must be followed by a newline character. The newline character causes the display of any text characters that follow the newline character to be displayed on a next line. If a newline character is already located in the position following the position equal to the calculated character count, no action is taken. However, if no newline character is located in the position following the position equal to the calculated character count, a newline character is added to the text at said position. The process is performed on each line of text. Thus, when the text is displayed on a browser other than the original browser or viewed as a flattened document, such as a PDF, the text looks exactly the same or originally entered.

As used herein, a document may be any web page or document displayed in a browser.

Various embodiments of a method and apparatus for preserving fidelity of rich text when converting between interactive and flat documents are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates a system 100 for preserving fidelity of bounded rich text appearance by maintaining reflow when converting between interactive and flat documents across different environments, configured in accordance with an embodiment of the present invention. The system 100 includes a server 102 and a client 104, communicatively connected via network 106. The server 102 is a type of computing device known to one of ordinary skill in the art that is used for providing computing services within the cloud, e.g., a blade server, virtual machine, and the like. Although the embodiments discussed here involve a cloud server, one skilled in the art will appreciate the invention may also be performed using any computing device, such as desktop computers, laptops, tablet computers, and the like. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like. The memory 112 includes an operating system 114, a text processing module 116, and a document database 118.

The client 104 is a computing device, such as desktop computers, laptops, tablet computers, and the like. The client 104 includes a Central Processing Unit (CPU) 120, support circuits 122, and a memory 124. The CPU 120 may include one or more commercially available microprocessors or microcontrollers that facilitate data processing and storage. The various support circuits 122 facilitate the operation of the CPU 120 and include one or more clock circuits, power supplies, cache, input/output circuits, and the like. The memory 124 includes at least one of Read Only Memory (ROM), Random Access Memory (RAM), disk drive storage, optical storage, removable storage and/or the like. The memory 124 includes an operating system 126, a browser 128, and a data collection module 130.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

A user on the client 104 accesses a web page via the browser 128. The browser 128 may be any type of web browser, for example GOOGLE CHROME®, SAFARI®, FIREFOX®, or INTERNET EXPLORER®. The web page has a document displayed in which a user wishes to add text. The user selects a bounded text area in the document and enters text. A bounded text area is a text box of a specified size where text may be entered. When a user enters text into a bounded text area, and the text fills the bounded text area, the text reflows to a next line. For example, the user may enter the text "Once upon a midnight dreary, while I pondered weak and weary, Over many a quaint and curious volume of forgotten lore," without entering any newline characters. A newline character forces the text that follows a newline character to be displayed on a next line. Due to the bounds of the text area, the entered text in the above example is displayed on three lines, such as:

Once upon a midnight dreary, while I pondered
weak and weary, Over many a quaint and
curious volume of forgotten lore The text automatically reflows to each next line due to the boundaries of the text area.

When the user has finished entering text, the user submits the document, using a method available on the web page, for example, by selecting a "submit" or "save" button. The user expects as part of a good user experience, that when the user views the document at a later time, regardless of the type of browser 128 that is used, even if different from the original browser 128, the entered text would have the same appearance. Specifically, the text entered on the first line should appear on the first line, the text entered on the second line should appear on the second line, and the text that was entered on the third line should appear on the third line.

Upon receiving input to save the data, the data collection module 130, which may be a plug-in to the browser 128, takes an image of the entered text. HyperText Markup Language (HTML) is used to create web pages. HTML5 has a canvas element and JAVASCRIPT provides the ability to control rendering of an HTML web page, including HTML elements inside of the canvas element. The data collection module 130 takes an image of the rendered DOM element (i.e., text area) that was created using JAVASCRIPT and advanced HTML5 structures. The text area has, among other properties, properties of height and width. An image of the entered text as rendered by the browser 128 is extracted by the data collection module 130 to create an exact replica using the canvas element. The image represents an exact same layout (appearance) of the entered text as it was entered in the browser 128. The data collection module 130 extracts the image information, herein referred to as image data, from the canvas structure. The data collection module 130 extracts the text data, such as plain text data. The plain text data in the present example is "Once upon a midnight dreary, while I pondered weak and weary, Over many a quaint and curious volume of forgotten lore". The data collection module 130 also extracts formatting metadata (i.e., font-family, for example "Arial"; font-size, for example "12 pt", font-color, for example, "Black", font-style, for example, "width:225px, padding:0px, margin:0px, border:1px, border-image-width:0px, overflow:auto", number of lines of text entered, in the present example, 3, the height and width of the text area, and the like) from the canvas structure. The data collection module 130 sends a request to the server to store the image data, text data, and formatting metadata to server 102 that provides a service to process and store the data. An example of server 102 is Acrobat.com.

The text processing module 116 receives the image data, text data, and formatting metadata and then segments the image into equal height sub-images based on a number of lines of text that appear in the image. For example, if there are three (3) lines of text in the image, the height is divided by three and the image is segmented into 3 sub-images of equal height. Each sub-image includes one line of text. The text processing module 116 applies an image processing algorithm, for example, an optical character recognition (OCR) algorithm, to each sub-image in order to extract the text from each sub-image. Because the image was created digitally, image quality is good, which results in a highly accurate OCR result. The text processing module 116 then uses the OCR to calculate a count for the number of characters in each line. The OCR algorithm ensures that if there are any leading or trailing spaces in the sub-image, said spaces are included in the calculated character count. Then, for each line, the text processing module 116 identifies the character at the position equal to the character count for the line of text. For example, in the current example, the first line "Once upon a midnight dreary, while I pondered" has a character count of 45. The text processing module 116 analyzes the text data "Once upon a midnight dreary, while I pondered weak and weary, Over many a quaint and curious volume of forgotten lore". The text processing module 116 identifies "d" at the end of "pondered" as the $45^{th}$ character. The text processing module 116 then inspects the character in the position following the identified character. In the present example, the character following the "d" in "pondered" of the text data, is a space. If the character is a newline character, the text processing module 116 does not alter the text data. However, if the character is not a newline character, the text processing module 116 adds a newline character to the text data at this position. The newline character forces the display of the remaining characters in the text data onto a next line. The text processing module 116 also stores the plain text data in addition to the formatting metadata with the document in the document database 118. When specified by the user to, for example, "submit" the document, the text processing module 116 also stores the document in a flattened form, for example, a PDF, in the document database 118.

As a result, when a user views the document in a browser 128, regardless of the type of browser 128, the text and its layout appear exactly as it did when the text was first entered. In addition, when the user views the document in flattened form, for example, when the user views the document as a PDF with a PDF viewer, the text and layout of the document appear exactly as it did when the text was first entered. This provides the user with a better user experience because the user sees information in the document as the user would expect it to appear.

Figure 2:
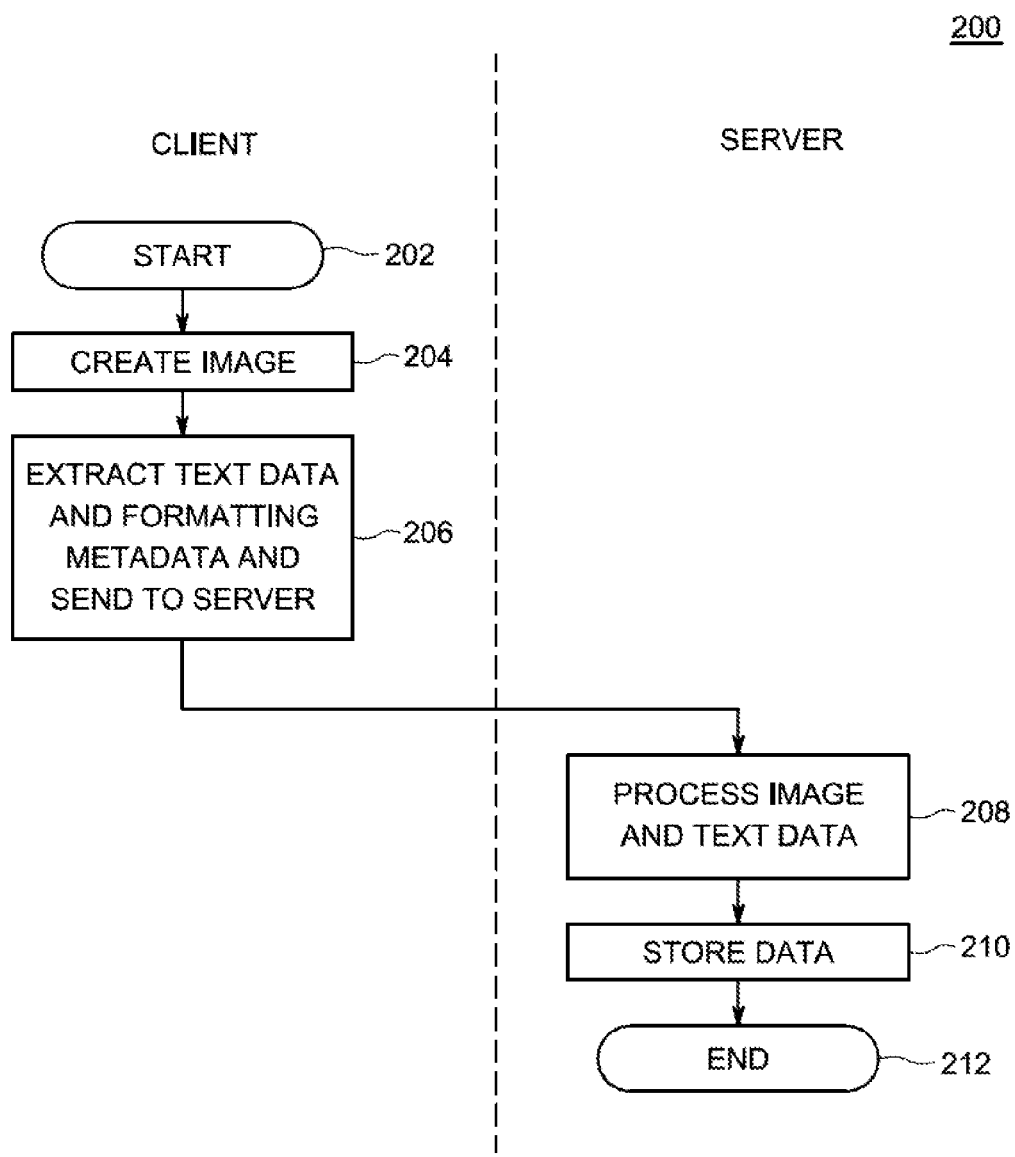
FIG. 2 depicts a flow diagram of a method for preserving fidelity of bounded rich text appearance by maintaining reflow when converting between interactive and flat documents across different environments, as performed by the data collection module and the text processing module of FIG. 1, according to one or more embodiments.

FIG. 2 depicts a flow diagram of a method 200 for preserving fidelity of bounded rich text appearance by maintaining reflow when converting between interactive and flat documents across different environments, as performed by the data collection module 130 and the text processing module 116 of FIG. 1, according to one or more embodiments. The method 200 evaluates text and processes the text to ensure it appears the same regardless of what browser is used to view the text or what form a document including the text is in when it is viewed. A user enters text on a web page and provides input to, for example, "save" or "submit" the information for storage. User input to, for example, "save" the document stores the text information for the document such that the text information may be viewed later in another browser. User input to, for example, "submit" the document stores the text information such that it may be viewed later in another browser, and also converts the document to a flattened document, for example, a PDF document. Although the exemplary embodiments refer to commands to "save" or "submit" the document, any commands may be implemented for use by the user without taking away from the spirit of the invention. The method 200 starts at step 202 and proceeds to step 204.

At step 204, the method 200 creates an image of the entered text. HTML has a canvas element and JAVASCRIPT has the ability to control rendering of an HTML web page, including HTML elements inside of the canvas element. To create an image using JAVASCRIPT, the method 200 may use for example, the toDataURL command. The code for creating image data from a canvas element may be as follows:

```
var canvas = document.createElement ("canvas")
canvas.width = 100;
canvas.height = 100;
var img = document.createElement("img")'
img.src = canvas.toDataURL("image/png");
```

The image provides a replica (that is, a faithful reproduction) of the text as it was entered, thereby preserving its fidelity. For example, using the previous example, the image would appear as follows:

Once upon a midnight dreary, while I pondered
weak and weary, Over many a quaint and
curious volume of forgotten lore The method 200 proceeds to step 206, where the method 200 extracts data from the canvas element. The method 200 extracts the plain text that was entered. Using the previous example, the plain text is text "Once upon a midnight dreary, while I pondered weak and weary, Over many a quaint and curious volume of forgotten lore"

The method 200 also extracts formatting metadata, for example, a font-family, font-size, font-color, font-style, a number of lines, and the like. The formatting information may be as follows:

font-size: "12 pt"
font-family: "Arial"
font-style "width:225px; padding:0px; margin:0px; border: 1px; border-image-width:0px; overflow:auto;"
rows: "3"

When all of the data is extracted, the method 200 facilitates receiving the image, plain text, and formatting metadata at the server. In this regard, it will be readily appreciated by those skilled in the art that some or all of the post-extraction processing may be performed locally at the client before sending to the server for storage and future retrieval by other users. Thus according to some embodiments, a portion of the processing of the extracted data is performed at the client side and the results are sent to the server for subsequent processing steps and storage. According to other embodiments, however all post-extraction processing steps are performed at the server. It suffices to say that the allocation of processing responsibility, as well as the location at which the steps are performed may be modified substantially without departing from the spirit and scope of the invention. The method 200 proceeds to step 208, where the method 200 processes the extracted image and plain text data as described in further detail with respect to FIG. 3 below. The method 200 proceeds to step 210, where the method 200 stores the processes data. The method 200 stores the text data and the formatting metadata. In the event that a user also requested to store the document as a flattened document, for example, a PDF, the method 200 converts the document to a flattened form, using any type of document converter, such as any PDF creation software. The method 200 then stores the PDF document along with the text data and formatting metadata. The method 200 proceeds to step 212 and ends.

Figure 3:
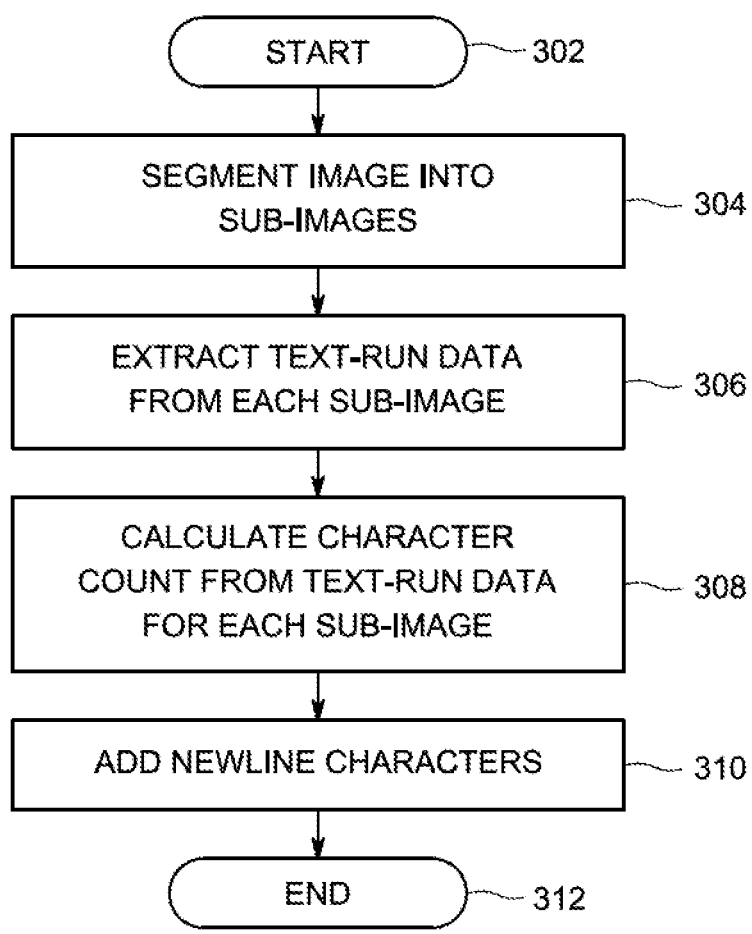
FIG. 3 depicts a flow diagram of a method for processing data extracted from an image, as performed by the text processing module of FIG. 1, according to one or more embodiments.

FIG. 3 depicts a flow diagram of a method 300 for processing data extracted from an image, as performed by the text processing module 116 of FIG. 1, according to one or more embodiments. The method 300 modifies the plain text as needed to ensure that it will appear in a display exactly as it appeared when the text was first entered. The method 300 starts at step 302 and proceeds to step 304.

At step 304, the method 300 segments the received image into sub-images. The method 300 processes the text one line at a time. As such, the method 300 segments the image into sub-images, where each sub-image is a single line of text. The method 300 divides the height of the image by the number of lines of text entered. The method 300 then divides the image into sub-images of equal height. Using the current example, the first sub-image is:

Once upon a midnight dreary, while I pondered
The second sub-image is:
weak and weary, Over many a quaint and
The third sub-image is:
curious volume of forgotten lore The method 300 proceeds to step 306, where the method 300 extracts the text data from each sub-image, to be referred as text-run data, i.e., data to determine the run length of the text on a line. The method 300 applies optical character recognition (OCR) on each sub-image to determine a character count of each sub-image, using the text-run data.

The method 300 proceeds to step 308, where the method 300 calculates a character count to determine a number of text characters that are present in each sub-image (i.e., in each line of text). In some embodiments, OCR is used to determine the character count, using the extracted text-run data.

The method 300 proceeds to step 310, where the method 300 adds newline characters, as needed to the actual text data. The method 300 uses the character count to identify a character in a position equal to the character count for the line. For example, "Once upon a midnight dreary, while I pondered" has a character count of 45. The method 300 identifies the "d" in "pondered" as the $45^{th}$ character (i.e., the character located at the position equal to the character count for the first line). The method 300 then evaluates the character following the identified character. If the character is a newline character, the method 300 does not alter the text data. However, if the character is not a newline character, the method 300 adds a newline character to the text data at this position. The newline character forces a later display of the remaining characters of the text data onto a next row. The method 300 proceeds to step 312 and ends.

Figure 4:
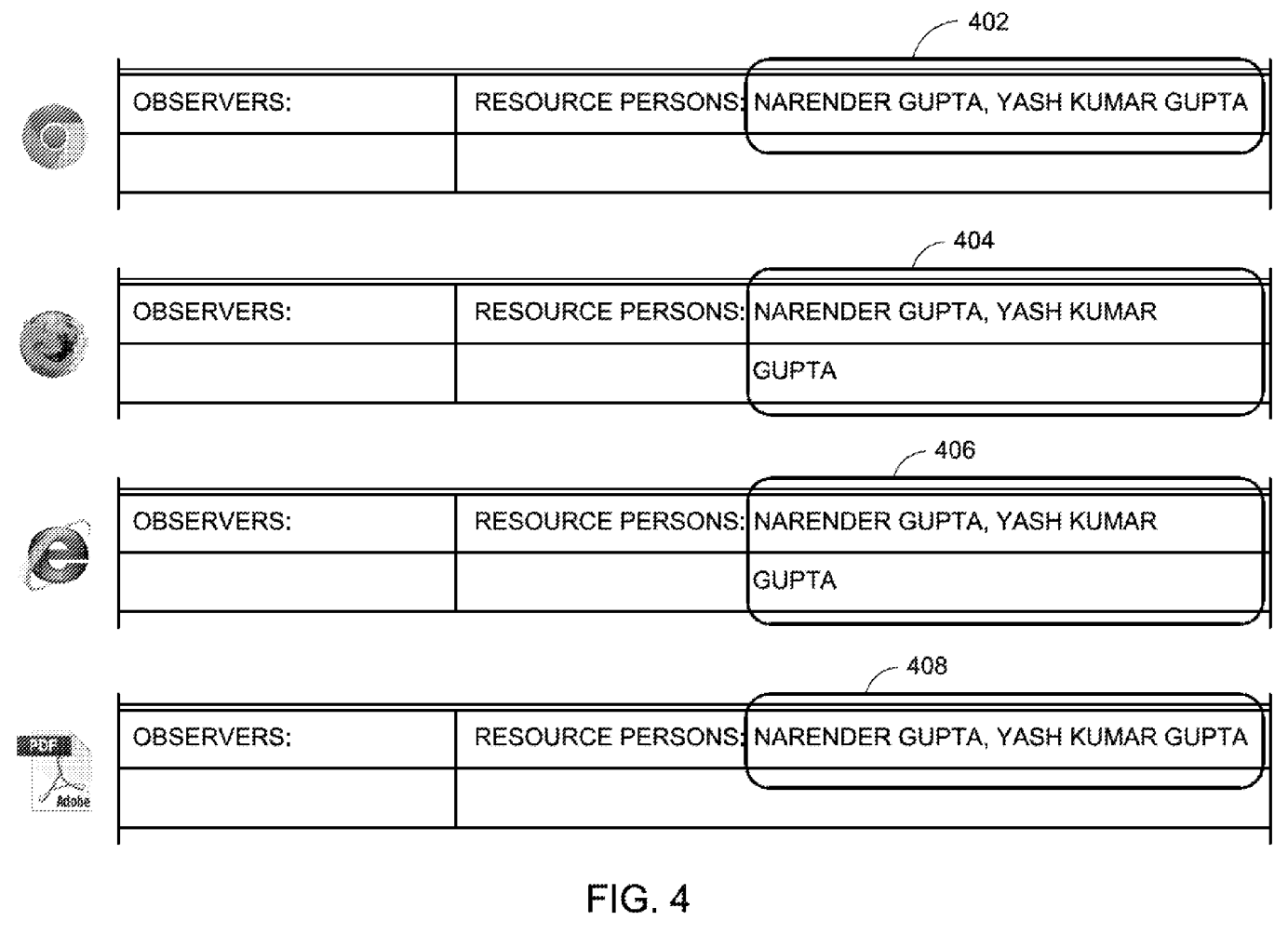

FIG. 4 illustrates a current view of how text is displayed differently depending on the browser in which a document is viewed and the format of the document. Text 402 is originally entered on a single line in a CHROME browser. When the text is stored and displayed at a later time using, for example, a FIREFOX browser, the text 404 is displayed over two lines. Similarly, when the text is displayed in an INTERNET EXPLORER browser, the text 406 is displayed over two lines. When the document is converted to a PDF, the text 408 is displayed on a single line, but there is less space after the text 408 than after the text 402 that was originally entered in the CHROME browser. This provides a poor user experience.

FIGS. 5A-5E collectively illustrate how fidelity of text is preserved, according to one or more embodiments. FIG. 5A illustrates a document that includes a multi-line text area 502. The multi-line text area 502 includes three lines of text that are entered in a CHROME browser. FIG. 5B illustrates the document that includes the multi-line text area 504 as displayed in an INTERNET EXPLORER browser. Although the font-family, font-style, font-size, and font-color are the same, the different browsers interpret the font information differently. As such, although the original text was entered on three lines, the text area 504 displays the text on four lines.

In accordance with the above description, in order to preserve the fidelity of the text, an image is taken of the text area 502 so as to represent an exact replica of the text area 502. The formatting information is sent with the image to a server.

FIG. 5C illustrates how the image is segmented into sub-images based on a number of lines in the original text. Because the original multi-line text area 502 has three (3) lines of text, the image is divided into three (3) sub-images, 506, 508, and 510; one sub-image for each line. A character count is calculated for sub-image. The sub-image 506 that represent a first line of the original text has a character count of 45. The sub-image 508 that represents a second line of the original text has a character count of 37. The sub-image 510 that represents a third line of the original text has a character count of 32.

FIG. 5D illustrates how the actual (for example "plain") text data from the multi-line text area 502 is modified to ensure fidelity. The actual text 512 is evaluated. The first line should have a character count of 45. As such, the character immediately following the 45$^{th}$ character must be a newline character in order to maintain the fidelity of the text. The character following the 45$^{th}$ character is evaluated to determine whether it is a newline character that forces the remaining characters to be displayed on a next line. The 46$^{th}$ character is a space, not a newline character. Therefore, a newline character is added as the 46$^{th}$ character. The modified text 514 includes newline characters 516, 518, and 520.

FIG. 5E illustrates how the document is displayed regardless of which browser is used. The added newline characters ensure that the text is the multi-line text are 522 is displayed exactly as it was originally entered.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving, by a server, an image of text as displayed on a webpage using a first browser and a set of text data and a set of formatting metadata corresponding to the text on the webpage using the first browser;
segmenting the image into a plurality of sub-images, wherein each sub-image represents a line of the text data;
extracting text characters from each sub-image; and
based on an analysis of the image and the set of formatting metadata, calculating, by the server, a count of characters corresponding to a line of entered text as shown in the image, wherein calculating the count of characters comprises counting a number of leading and trailing spaces in the line of entered text;
identifying, from the set of formatting data, a character at a position equal to the count of characters corresponding to the line of entered text as shown in the image;
determining whether a next character after the identified character is a newline character;
based on determining that the identified character is not a newline character, generating a file that allows the text to be displayed by a second browser of a different type or in flattened form as the text was displayed on the webpage using the first browser by inserting a newline character at the position equal to the count of characters corresponding to the line of entered text; and
using the generated file to display the text in flattened form exactly as the text was displayed on the webpage by the first browser.

2. The method of claim 1, wherein:
receiving the image of text comprises receiving an image that is extracted from an HTML canvas,
receiving the set of text data comprises receiving at least a set of plain text data of the text on the webpage, and
receiving the set of formatting metadata comprises receiving at least one of a font-family, font-size, font-style, font-color, or a number of lines of text.

3. The method of claim 1, wherein segmenting comprises dividing a height of the image by a number of lines of text and dividing the image to create a number of sub-images equal to the number of lines of text, where each sub-image is of equal height.

4. The method of claim 1, wherein extracting text characters from each sub-image comprises applying an optical character recognition algorithm.

5. The method of claim 1, further comprising using the generated file to render the text in a second browser of a different type exactly as the text was displayed on the webpage by the first browser.

6. The method of claim 1, wherein calculating the count of characters comprises identifying how many characters are in the line of entered text.

7. The method of claim 1, wherein inserting the newline character at the position equal to the count of characters corresponding to the line of entered text comprises entering the newline character after a last character of the line of entered text.

8. A system for preserving fidelity of bounded rich text appearance by maintaining reflow when converting between interactive and flat documents across different environments comprising:
at least one processor; and
at least one non-transitory computer readable storage medium storing instructions that, when executed by the at least one processor, cause the system to:
receive an image of text as displayed on a webpage using a first browser and a set of text data and a set of formatting metadata corresponding to the text on the webpage using the first browser;
segment the image into a plurality of sub-images, wherein each sub-image represents a line of the text data;
extract text characters from each sub-image; and
based on an analysis of the image and the set of formatting metadata, calculate a count of characters corresponding to a line of entered text as shown in the image performing steps comprising counting a number of leading and trailing spaces in the line of entered text;
identify, from the set of formatting data, a character at a position equal to the count of characters corresponding to the line of entered text as shown in the image;
determine whether a next character after the identified character is a newline character; and
based on determining that the identified character is not a newline character, generate a file that allows the text to be displayed by a second browser of a different type or in flattened form as the text was displayed on the webpage using the first browser by inserting a newline character at the position equal to the count of characters corresponding to the line of entered text; and
use the generated file to display the text in flattened form exactly as the text was displayed on the webpage by the first browser.

9. The system of claim 8, wherein:
the image comprises an image that is extracted from an HTML canvas,
the set of text data comprises at least a set of plain text data of the text on the webpage, and
the set of formatting metadata comprises at least one of a font-family, font-size, font-style, font-color, or a number of lines of text.

10. The system of claim 8, wherein the instructions, when executed by the at least one processor, cause the system to segment by performing steps comprising dividing a height of the image by a number of lines of text and dividing the image to create a number of sub-images equal to the number of lines of text, where each sub-image is of equal height.

11. The system of claim 8, wherein the instructions, when executed by the at least one processor, cause the system to extract text characters from each sub-image by performing steps comprising applying an optical character recognition algorithm.

12. The system of claim 8, wherein performing the steps further comprises identifying how many characters are in the line of entered text.

13. The system of claim 8, wherein the instructions, when executed by the at least one processor, cause the system insert the newline character at the position equal to the count of characters corresponding to the line of entered text by entering the newline character after a last character of the line of entered text.

14. A non-transitory computer readable medium storing instructions thereon that, when executed by at least one processor, cause a computer system to perform a method for preserving fidelity of bounded rich text appearance by maintaining reflow when converting between interactive and flat documents across different environments comprising:
receiving an image of text as displayed on a webpage using a first browser and a set of text data and a set of formatting metadata corresponding to the text on the webpage using the first browser;
segmenting the image into a plurality of sub-images, wherein each sub-image represents a line of the text data;
extracting text characters from each sub-image; and
based on an analysis of the image and the set of formatting metadata, calculating a count of characters corresponding to a line of entered text as shown in the image, wherein calculating the count of characters comprises counting a number of leading and trailing spaces in the line of entered text;
identifying, from the set of formatting data, a character at a position equal to the count of characters corresponding to the line of entered text as shown in the image;
determining whether a next character after the identified character is a newline character;
based on determining that the identified character is not a newline character, generating a file that allows the text to be displayed by a second browser of a different type or in flattened form as the text was displayed on the webpage using the first browser by inserting a newline character at the position equal to the count of characters corresponding to the line of entered text; and
using the generated file to display the text in flattened form exactly as the text was displayed on the webpage by the first browser.

15. The non-transitory computer readable medium of claim 14, wherein:
receiving the image comprises receiving an image that is extracted from an HTML canvas,
receiving the set of text data comprises receiving at least a set of plain text data of the text entered on the webpage, and receiving the set of formatting metadata comprises receiving at least one of a font-family, font-size, font-style, font-color, or a number of lines of text.

16. The non-transitory computer readable medium of claim 14, wherein segmenting comprises dividing a height of the image by a number of lines of text and dividing the image to create a number of sub-images equal to the number of lines of text, where each sub-image is of equal height.

17. The non-transitory computer readable medium of claim 14, wherein extracting text characters from each sub-image comprises applying an optical character recognition algorithm.

18. The non-transitory computer readable medium of claim 14, wherein using the generated file further comprises rendering the text in a second browser of a different type exactly as the text was displayedon the webpage by the first browser.

19. The non-transitory computer readable medium of claim 14, wherein calculating the count of characters comprises identifying how many characters are in the line of entered text.

20. The non-transitory computer readable medium of claim 14, wherein inserting the newline character at the position equal to the count of characters corresponding to the line of entered text comprises entering the newline character after a last character of the line of entered text.

* * * * *